Figure 1:
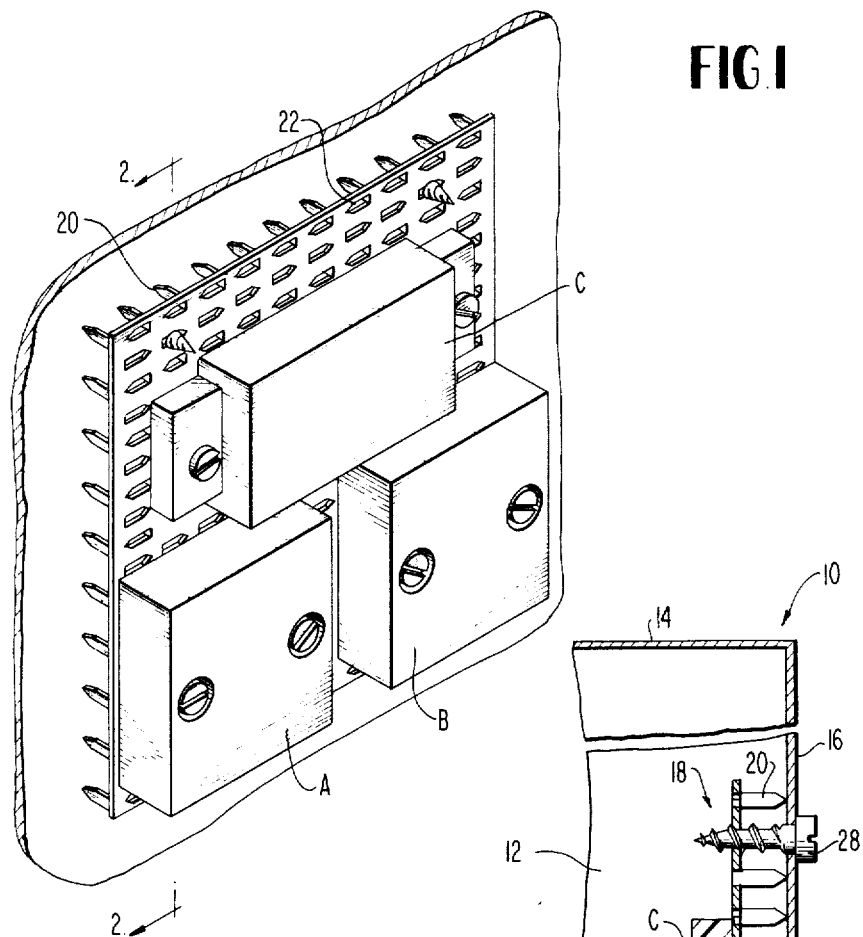

United States Patent [19]

Leutwyler

[11] 3,960,353

[45] June 1, 1976

[54] ELECTRICAL COMPONENT MOUNTING PANEL

[75] Inventor: Roy B. Leutwyler, Miami, Fla.

[73] Assignee: Automated Building Components, Inc., Miami, Fla.

[22] Filed: Feb. 10, 1975

[21] Appl. No.: 548,730

[52] U.S. Cl. .................. 248/309 R; 248/DIG. 6; 317/119
[51] Int. Cl.² ........................................... A47F 5/00
[58] Field of Search .......... 248/309, DIG. 3, DIG. 6; 174/DIG. 3, DIG. 5, 52 R; 317/119, 101; 85/32, 36; 339/125

[56] References Cited
UNITED STATES PATENTS

| | | | |
|---|---|---|---|
| 1,066,706 | 7/1913 | Caine | 248/DIG. 6 |
| 1,801,550 | 4/1931 | Fullman | 248/DIG. 6 |
| 3,097,821 | 7/1963 | Richards | 248/DIG. 6 |
| 3,532,938 | 10/1970 | Holman et al. | 317/119 |
| 3,686,533 | 8/1972 | Garnier et al. | 174/DIG. 3 |

FOREIGN PATENTS OR APPLICATIONS 2,045,044    3/1972    Germany .......................... 248/309

Primary Examiner—James T. McCall
Assistant Examiner—Robert A. Hafer
Attorney, Agent, or Firm—LeBlanc & Shur

[57] ABSTRACT

Disclosed is a panel for securing electrical components in an electrical box or enclosure. The panel includes a plate comprised of sheet metal and having a plurality of teeth struck to extend in a generally normal direction to one side of the plate leaving a plurality of slots in the plate from which the teeth are struck. The electrical components are secured to the plate by screws which are threadedly received in the slots left by the teeth when struck from the plate. The plate is secured to a wall of the enclosure by screws which extend through the wall and into the slots left by the teeth from the side of the plate remote from the electrical components. The plate is therefore spaced from the wall of the enclosure with the tips of the teeth bearing directly against the enclosure wall.

4 Claims, 2 Drawing Figures

U.S. Patent  June 1, 1976  3,960,353

3,960,353

ELECTRICAL COMPONENT MOUNTING PANEL

The present invention relates to an electrical component mounting panel and particularly relates to a support panel for electrical components which facilitates mounting thereof to and within an electrical component box to form a complete assemblage.

Conventionally, a flat sheet of metal with flanges on its four edges is usually utilized to mount electrical components in an electrical component box. Most often, sheet metal is drilled to receive the mounting screws of a first group or installation of electrical components. This mounting procedure is not only time consuming but also requires the formation, i.e., drilling of additional mounting holes in the sheet metal when additional electrical components are to be mounted in the box and which additional drilling is difficult and awkward since the initially mounted components usually lie in positions which interfere with such additional drilling. Further, such additional drilling for the mounting screws is necessary even when changing electrical components since each manufacturer of electrical components normally uses different mounting hole spacings in comparison with the mounting hole spacings for similar or dissimilar components fabricated by other manufacturers. Consequently, there has arisen the need for an electrical mounting panel wherein electrical components can be readily secured to and removed from a mounting plate without requiring the formation of new mounting holes for each installation or change of electrical components in an installation and which panel can receive the component mounting screws substantially irrespective of the location of the electrical components on the mounting plate or the different mounting hole spacings used on various types of electrical components.

Accordingly, the present invention provides a novel and improved electrical component mounting panel which includes a sheet metal plate which has a plurality of teeth struck from the plate to extend generally normal thereto and to one side thereof. A plurality of slots are formed in the plate when the teeth are struck therefrom. The teeth are struck to form a plurality of longitudinally extending transversely spaced rows thereof with the teeth being closely longitudinally and transversely spaced one from the other whereby a plurality of discrete closely spaced slots are left in the mounting plate. To secure the electrical components to the mounting plate, such components are disposed against the plate and mounting screws are inserted through the mounting holes of the components and threaded into the slots left in the plate by the struck teeth. The close spacing of the struck teeth and the consequent close spacing of the slots enables virtually any type of electrical component to be mounted at substantially any location along the mounting plate, in virtually any orientation relative to the plate, and irrespective of the different mounting hole spacings of various electrical components. Moreover, the close spacing and distribution of the slots over the entire surface of the plate enables securement of the components thereto without the necessity of forming, i.e., drilling, additional mounting holes when installing additional components or changing components.

The mounting plate is secured to the electrical box by engaging screws through the wall of the box and into the slots in the plate left by the struck teeth. Such panel mounting screws engage the plate from the side thereof remote from the electrical components. Thus the plate can be mounted in the box at virtually any location or orientation. Also, with the foregoing mounting, it will be appreciated that the mounting plate is spaced from the wall of the box sufficiently such that electrical wires, where necessary and desirable, can be threaded between and about the teeth of the mounting plate for electrical interconnection between the electrical components secured to the plate. In this manner, such interconnecting wiring is located between the mounting plate and the panel box wall and does not encumber the exposed front side of the electrical box.

Accordingly, it is a primary object of the present invention to provide a novel and improved electrical component mounting panel.

It is another object of the present invention to provide a novel and improved electrical component mounting panel wherein interconnection between the electrical components and the support panel therefor is greatly facilitated.

It is still another object of the present invention to provide a novel and improved electrical component mounting panel wherein various electrical components having various mounting hole spacings are readily and easily secured to the panel.

It is a further object of the present invention to provide a novel and improved electrical components mounting panel wherein electrical components can be initially secured to the panel or changed without custom forming the support panel for each component to provide mounting openings therefor upon each installation or change of components.

It is a still further object of the present invention to provide a novel and improved electrical component mounting panel of a type wherein the panel per se is spaced from the wall of the electrical box containing the panel and which spacing permits electrical interconnection between the various components supported thereby.

It is a still further object of the present invention to provide a novel and improved electrical component mounting panel for electrical components which is readily and easily secured to the electrical box and which is economical in construction.

Figure 2:
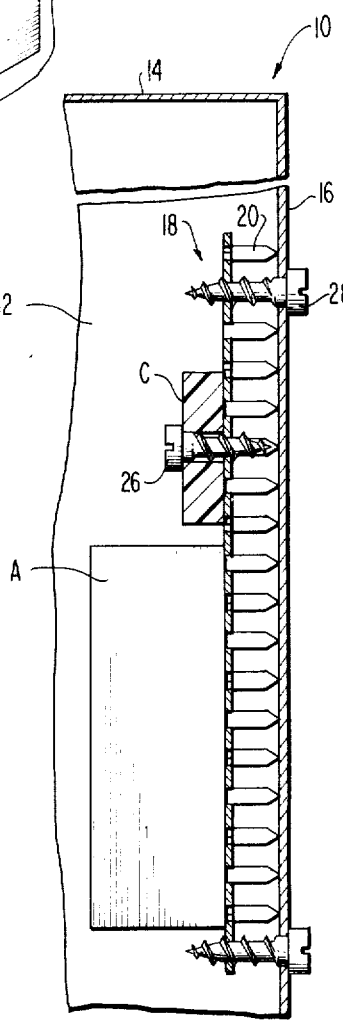

These and further objects and advantages of the present invention will become more apparent upon reference to the following specification, appended claims and drawings wherein:

FIG. 1 is a fragmentary perspective view of an electrical component mounting panel constructed in accordance with the present invention; and FIG. 2 is a cross sectional view thereof taken generally about on lines 2—2 in FIG. 1.

Referring now to the drawings, there is illustrated an electrical box, generally designated 10, having side, end and back or rear walls 12, 14 and 16, respectively and in which the electrical component mounting panel hereof, generally designated 18, is secured. The electrical box 10 may be of any conventional construction and may, of course, have a pivoted closure, not shown, if desired opposite back or rear wall 16 providing for access within the box 10.

The mounting panel 18 comprises a support for various electrical components, such as designated A, B, and C in the illustration and particularly comprises a sheet metal plate which has a plurality of elongated teeth 20 struck to extend generally normal to the plate and to one side thereof to leave a plurality of slots 22 in the plate. As illustrated, teeth 20 are preferably struck to form a plurality of longitudinally extending transversely spaced rows of teeth with the teeth in each row being closely spaced one to the other and closely spaced relative to the teeth of the transversely adjacent rows. It will also be appreciated from a review of FIG. 1 that teeth 20 are uniformly distributed throughout the plate. The slots 22 left in the plate are elongated in the direction of each longitudinally extending row of teeth and are transversely spaced one from the other. Consequently, slots 22 are also uniformly distributed throughout the plate. It will be appreciated that teeth 20 may be struck in different arrangements in the plate, for example the teeth may be struck in transversely extending rows or in a random pattern as desired, it being necessary, however, and in accordance with the present invention, to provide a large number of teeth distributed throughout the plate in order to both support the plate spaced from the wall of the electrical box in a manner set forth hereinafter, as well as to provide a large number of closely spaced slots distributed throughout the plate for facilitating connection of the electrical components to the support plate and mounting the support plate to the electrical box.

The illustrated electrical components, A, B, and C may comprise electrical components of any type and it will be seen from an inspection of FIG. 1 that the mounting hole spacing of such components varies from component to component as is typical for commercially available electrical components. In order to mount the electrical components to the support panel, screws 26 are received through standard openings provided in the electrical components and are threadedly received in selected slots 22 of the support plate. It will be noted that slots 22 are closely spaced one from the other such that the mounting holes in the electrical components which receive the mounting screws may be aligned with selected ones of the slots 22 in the support plate. Consequently, the mounting of a particular electrical component is accomplished simply by aligning its mounting holes with selected slots and threading the mounting screws into the slots. The components may thus be secured to the panel at any location along its surface or in substantially any orientation relative thereto. For example, component C is illustrated as extending substantially longitudinally along the support panel. It will be appreciated, however, that it could be mounted diagonally or even vertically or at any other angular orientation as desired. Further, the elongated nature of the slots and their close spacing and distribution throughout the plate enable securement of substantially any electrical component to the mounting panel irrespective of the spacing of the mounting holes of the particular component.

To secure the mounting plate to the electrical box, screws 28 are received through predrilled openings in the back wall 16 of the box and are threadedly received in the slots 22 of the mounting panel. It will be appreciated that the screws 28 are received on the side of the mounting panel remote from the components and that when the mounting panel is finally secured to the box, the tips of teeth 20 bear against the wall 16 spacing the base portion of the support plate from wall 16. The spacing of the plate from wall 16 is essential such that the mounting screws 26 for the electrical components can be threaded into the slots without also penetrating the rear wall 16 of the electrical box. Moreover, spacing the mounting plate from the back wall is desirable and preferable since it enables electrical wiring, for example wire interconnecting between the mounting electrical components, to be threaded between and about the teeth as necessary. This removes such wiring from the face of the electrical box and leaves it substantially unencumbered and free for installation and removal of additional electrical components as necessary and desirable.

Accordingly, it will be appreciated from the foregoing that the objects of the present invention are fully accomplished in that the present invention provides an inexpensive mounting panel which facilitates the mounting of electrical components and eliminates the necessity of drilling additional holes as is conventional when it is desired to mount additional components. Also, the present mounting panel enables the mounting of electrical components having different mounting hole spacings. This is accomplished by the close spacing both longitudinally and transversely of the slots in the mounting plate which provide a multiplicity of mounting hole locations. This also enables the components for mounting in virtually any angular orientation about the plate and it will be seen that the support plate itself together with the components can be readily and easily mounted in the electrical box without predrilling the support plate or any other type of custom operation for each additional installation.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. An assemblage comprising an electrical component mounting panel of sheet metal having a plurality of teeth struck therefrom to extend in a generally normal direction to one side of the plate and leaving a plurality of slots in said plate from which said teeth are struck, an electrical component, and means for securing said electrical component to said plate including a screw engaging said component and threadedly received in one of the slots in said plate, a backing panel, said plate being disposed against said backing panel with the tips of said teeth bearing against said backing panel, and means for securing said plate to said backing panel including screws threadedly engageable in said slots.

2. An assemblage comprising a mounting panel according to claim 1 wherein the latter screws engage through said plate from a side thereof opposite the side from which the first mentioned screw engages through the plate.

3. An assemblage including a mounting panel according to claim 1 including an enclosure for said electrical components, said backing panel comprising one wall of said enclosure.

4. An assemblage including a mounting panel according to claim 1 including a plurality of electrical components, means for securing each component to said plate including screws engaging said components and threadedly received in the slots of said plate, the screws securing said plate to said backing panel engaging through said plate from a side thereof remote from said electrical components.

* * * * *